United States Patent [19]
Mitra

[11] Patent Number: 5,594,894
[45] Date of Patent: Jan. 14, 1997

[54] MICROCONTROLLER WITH PROGRAMMABLE POSTSCALER FOR PULSE WIDTH MODULATION INTERRUPT

[75] Inventor: Sumit K. Mitra, Tempe, Ariz.

[73] Assignee: Microchip Technology Incorporated, Chandler, Ariz.

[21] Appl. No.: 319,985

[22] Filed: Oct. 7, 1994

[51] Int. Cl.⁶ .................... G06F 1/14; G06F 9/06
[52] U.S. Cl. .................... 395/556; 364/DIG. 2; 364/926.9; 364/949; 364/941; 395/733
[58] Field of Search .................... 395/550, 733, 395/739

[56] References Cited

U.S. PATENT DOCUMENTS

| | | | |
|---|---|---|---|
| 4,061,881 | 12/1977 | Widl | 179/15 |
| 4,165,490 | 8/1979 | Howe, Jr. et al. | 328/60 |
| 4,244,258 | 1/1981 | Finch | 84/1.03 |
| 4,321,687 | 3/1982 | Parsons et al. | 364/900 |
| 4,339,819 | 7/1982 | Jacobson | 371/16 |
| 4,745,573 | 5/1988 | Lebel | 364/900 |
| 4,858,178 | 8/1989 | Breuninger | 364/900 |
| 4,881,040 | 11/1989 | Vaughn | 328/61 |
| 4,922,137 | 5/1990 | Small et al. | 307/480 |
| 5,377,346 | 12/1994 | Williams | 395/550 |
| 5,418,932 | 5/1995 | Watabe et al. | 395/550 |
| 5,471,608 | 11/1995 | Lee et al. | 395/550 |
| 5,471,635 | 11/1995 | Williams | 395/550 X |

*Primary Examiner*—Thomas M. Heckler
*Attorney, Agent, or Firm*—Wigman, Cohen, Leitner & Myers, P.C.

[57] ABSTRACT

A microcontroller device is fabricated in a semiconductor integrated circuit chip for controlling an external system with which the microcontroller device is to be installed in circuit. The device includes a CPU, a program memory, a data memory, and peripherals for use in controlling the external system. An on-chip peripheral timing module establishes the timing of and degree of control exercised over the external system by a generating a repetitive event configured as a pulse waveform. The timing module is adapted for selectively setting the period of the pulse waveform to designate the frequency of occurrence of the repetitive event for the timing of control and to provoke a corresponding periodic interrupt of the CPU. The width of the pulse in each period of the pulse waveform is selectively modulated to set the degree of control. The timing module selectively varies the frequency of periodic interrupts of the CPU without affecting the period of the pulse waveform. In one embodiment, the selective variation of frequency of the periodic interrupts is performed by a divider circuit.

9 Claims, 2 Drawing Sheets

MICROCONTROLLER WITH PROGRAMMABLE POSTSCALER FOR PULSE WIDTH MODULATION INTERRUPT

BACKGROUND OF THE INVENTION

The present invention relates generally to a class of semiconductor microprocessors utilized as microcontrollers to perform selective control functions on an external controlled system.

Microcontrollers having all peripherals embedded on the same single microcontroller chip have become increasingly popular in a large number of diverse control applications. These include, for example, pocket pagers, meters and testers, keyboard controllers capable of offloading many tasks which would otherwise require handling by the processor in personal computers, modems for command interpretation and data transmission, printer buffers for high speed data dumping, color plotters, color copiers, electronic typewriters, cable TV terminal equipment, lawn sprinkling controllers, credit card phone equipment, automotive applications including engine control modules, antilock braking systems, user-adjustable suspension control, and various other applications in industrial controls, telecommunications, automotive, appliance, computer and consumer markets.

Real time microcontrollers provide rapid solutions to signal processing algorithms and other numerically intensive computations, control events such as opening and closing of relays, position and speed of a motor, and other control functions. The central processing unit (CPU) of the microcontroller operates in conjunction with certain peripherals to perform the control function, including timers, signal ports, baud rate generators, and others.

Generally, one or more timers (typically registers which are, say, 8 or 16 bit wide) are fabricated on board the microcontroller chip (i.e., integrated within the circuitry of the single chip itself). The timers are utilized to implement various timing functions of the device. One may be a capture function, which enables recording a time stamp of the occurrence of an event of interest. For example, the event of interest may be a change in the logic state at an external pin, from "0" to "1", or "1" to "0". To capture the precise moment at which the pin change occurs, a 16 bit wide timer might be used together with a 16 bit wide shadow register that acts as a capture register. When the pin bit value changes, the timer value (count) is captured on the shadow register. Upon completion of the transfer, an interrupt is generated to the CPU of the microcontroller. Then, after the CPU has completed the task it was performing when the change took place, it can check on the timing of the event of interest at its leisure.

Another timing function—a compare function—is often used in microcontrollers to generate an event of some type, such as a pulse, or a change in logic state of a pin. A time base is provided by the timer (e.g., 16 bit wide), but in this case the associated shadow register (compare register) writes the value or time stamp for the desired time of occurrence of the event. Thus, the compare function of a microcontroller device allows the user to set an event to occur at a precise specified time or times.

The present invention is directed to yet another timing function commonly employed in microcontrollers, namely, pulse width modulation (PWM). PWM involves repetitive events, in contrast to the single occurrence event 'capture' and 'compare' functions. With PWM, a repetitive waveform may be generated at a pin, with a period in which the pin is at one logic state (e.g., high) for a specified time interval, and at another logic state (e.g., low) for another specified time interval. The timing of the high and low states is selected to modulate the width of the pulse. The period of the PWM is the sum of the high and low intervals, and is determined by the timer.

PWM is especially useful to generate analog signals. For an 8 bit entity, for example, the pulse width may be set at any value between 0 and 255. A large number is thereby encoded into a digital signal, which is then used to generate an analog signal for performing the desired function, such as to drive a motor. The motor can be run at a slow rate by making the pulse width commensurately small, and at a faster rate by concomitantly increasing the pulse width.

The period of the repetitive waveform of the PWM function may be selected by the user, as a fixed number written into a register at the outset. Or it may be desired to change the waveform period or duty cycle at various times, such as to ramp up the speed of a motor. The user may want to eliminate noise encountered in the operation of a personal computer which is attributable to moving pans, such as a fan driven by PWM from the microcontroller. To that end, since noise or whine occurs from vibrations at frequencies in the audible range up to about 20 kilohertz (KHz), it would be desirable to run the mechanical parts in question at a frequency that exceeds 20 KHz. A contrasting example of the use of PWM is in an industrial control requiring a large motor to be driven. There, it is necessary to select a much lower frequency PWM waveform, e.g., on the order of 1 KHz, because of the inability of a large motor to respond to higher frequencies with any significant power efficiency.

It would be desirable to provide flexibility in specifying the duty cycle of the PWM timing function, to accommodate different applications of the microcontroller in which operating frequencies may range from the low to the high extremes.

The time base of the PWM module of the microcontroller is provided by a timer incremented from zero to a count that matches the value written by the user to a register. When the match occurs, the timer is automatically reset and the count restarted at zero. By writing an appropriate value to the register, the timer controls the period of the repetitive waveform. An interrupt is generated is also generated periodically in synchronism with each period of the PWM waveform. This imposes greater overhead on the CPU and adversely affects the overall operation of the microcontroller by slowing the performance of the CPU.

Therefore, it is a principal important object of the present invention to avoid the necessity for constant interrupts of the CPU of the microcontroller, while still maintaining considerable latitude to alter the period and the duty cycle of the PWM waveform.

SUMMARY OF THE INVENTION

According to the present invention, a scheme is provided by which interrupts are generated in connection with the PWM function of the microcontroller only at relatively long intervals, while still permitting the PWM to be run at considerably higher frequencies. This is achieved by use of a postscaler circuit in conjunction with a PWM timing module. The postscaler functions to reduce the interrupt overhead by reducing the frequency of interruption of the CPU, without affecting the setting of the period of the waveform.

In a preferred embodiment, the microcontroller device is fabricated in a semiconductor integrated circuit chip for controlling an external system with which the microcontroller device is to be installed in circuit. The device includes a CPU, a program memory, a data memory, and peripherals for use in controlling the external system. An on-chip peripheral timing module establishes the timing of and degree of control exercised over the external system by a generating a repetitive event configured as a pulse waveform. The timing module is adapted for selectively setting the period of the pulse waveform to designate the frequency of occurrence of the repetitive event for the timing of control and to provoke a corresponding periodic interrupt of the CPU. The width of the pulse in each period of the pulse waveform is selectively modulated to set the degree of control. The timing module selectively varies the frequency of periodic interrupts of the CPU, by division, without affecting the period of the pulse waveform.

BRIEF DESCRIPTION OF THE DRAWINGS

The above and still further objects, features, aspect and attendant advantages of the invention will become apparent from a consideration of the following detailed description of the presently contemplated best mode of carrying out the invention, as set forth in a preferred embodiment, taken in conjunction with the accompanying drawings in which.

DETAILED DESCRIPTION OF THE PREFERRED EMBODIMENT AND METHOD

Figure 1:
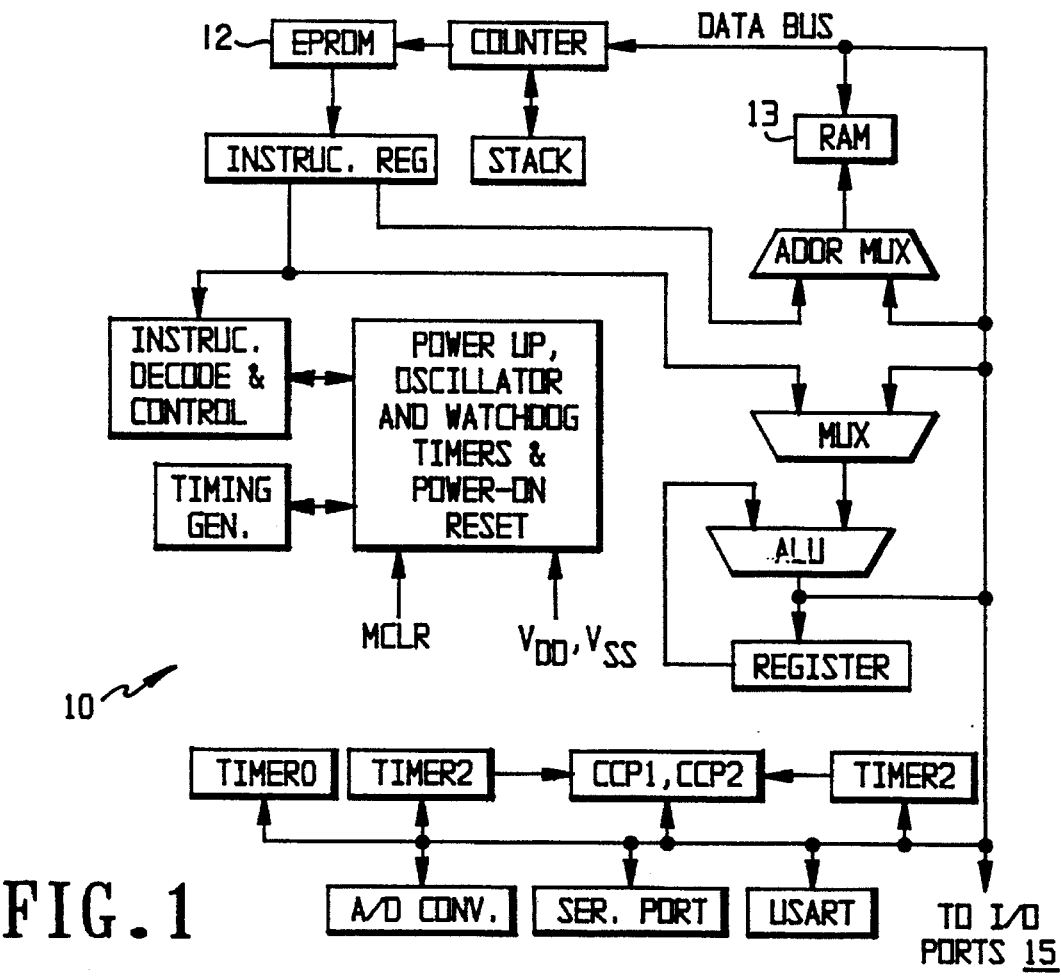
FIG. 1 is a simplified block diagram of a single chip microcontroller device in which the invention is implemented.

FIG. 1 is a block diagram of the relevant portion of a semiconductor integrated circuit (IC) programmable microcontroller device fabricated on a single silicon chip and having a plurality of integrated peripheral timing function modules, each of which may be configured and reconfigured (i.e., programmed and reprogrammed) at will by the user, in accordance with the present invention, to provide specific timing functions required by the particular user application of the device. The microcontroller chip 10 of FIG. 1 includes, among other elements, a central processing unit (CPU), an EPROM (Electrically Programmable Read Only Memory) program memory 12 that stores instructions to be implemented by the CPU, a RAM (Random Access Memory) data memory 13 that stores data including data representing parameters of the external system to be controlled by the microcontroller, and I/O (Input/Output) ports 15.

Figure 2:
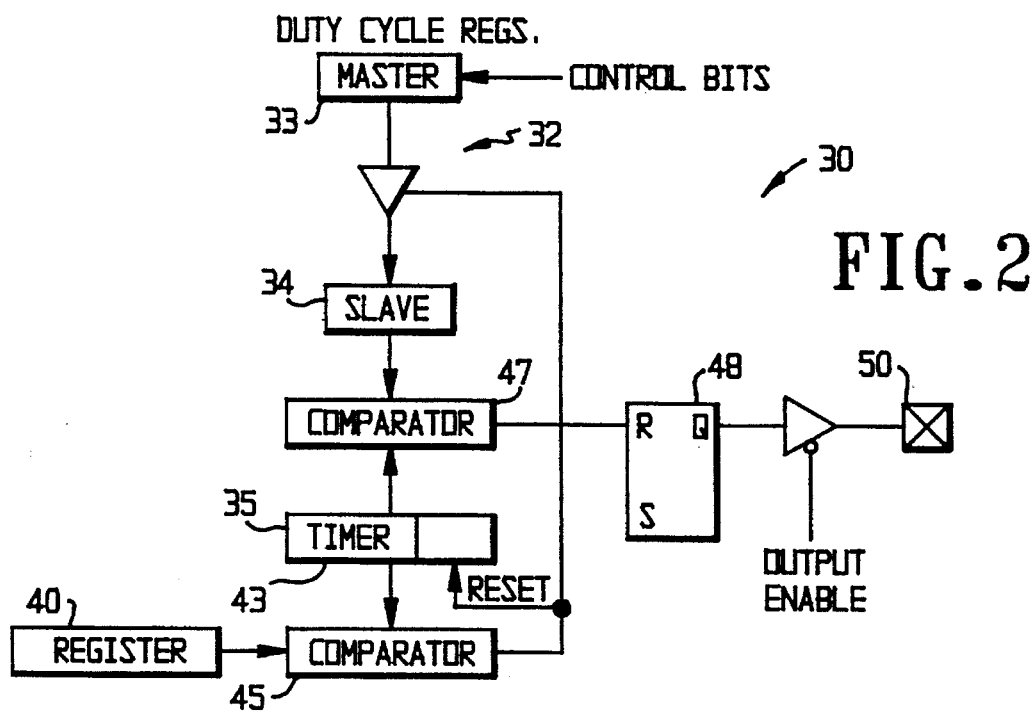
FIG. 2 is a simplified block diagram of a PWM timing module which is part of the CCP module utilized as an on-chip peripheral in the device of FIG. 1.
Figure 4:
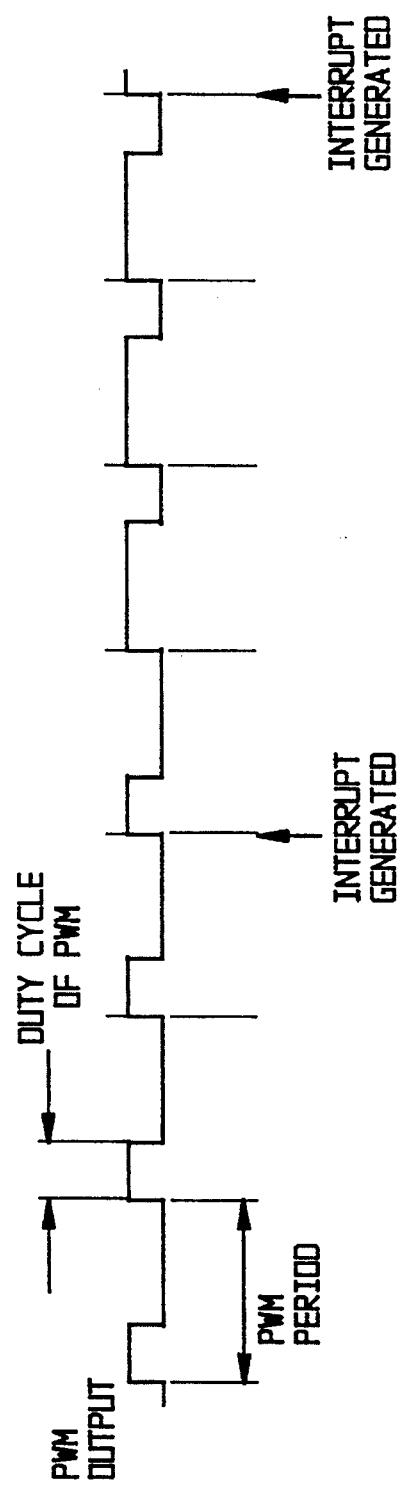
FIG. 4 is a pulse waveform illustrating the period, duty cycle, pulse width modulation, and timing of interrupts.

The microcontroller has several timing function modules (labeled CCP in FIG. 1, i.e., CCP1, CCP2, etc.—designating capability of performing each of the Capture, Compare, and PWM functions). An exemplary embodiment of a CCP module implemented to perform the PWM timing function is illustrated in FIG. 2. In essence, a repetitive event is generated by the PWM module as a pulse waveform in which the width of its output pulses is modulated by values set by the user. In the case of PWM module 30, a repetitive digital output is provided whose period (interval occupied by one cycle) is controlled by the count of a timer 35, and whose duty cycle (width of the pulse generated in any given period) is controlled by the value written to a register 32, of 16 bit length for example. The PWM period and duty cycle of the output generated by PWM module 30 are shown in FIG. 4. As indicated there, in a typical application of the microcontroller, such as for controlling the speed of a DC motor, the PWM period is fixed and the duty cycle is varied from period to period. The digital output waveform may be converted to an analog signal for control purposes.

Period timer 35, which will be described in greater detail presently, comprises a readable/writable register (8-bit, for example) that provides the time base, and in conjunction with an 8-bit readable/writable register period 40, the PWM period, for the PWM module. A value written to register 40 to program the period of the PWM waveform is constantly compared with the value of a register 43 in timer 35 by a comparator 45. When a match occurs between those two values, a 'match' output is generated by the comparator to set a latch 48, reset timer 35, and invoke a master/slave transfer in the duty cycle registers. An interrupt generated by the timer to the CPU allows a new value to be written to the period register. The value of the timer register 43 is input to a comparator 47.

Duty cycle register 32 is preferably folded into two 8 bit registers 33 and 34, configured in pipelined or master/slave fashion. Values may thus be written by the user to register 33 (through the CPU) for the desired duty cycle modulation so that pulse width changes take place automatically only at the boundary, rather than in midpulse. A change of pulse width at a point other than the boundary could not be interpreted, and any new value written seeking to accomplish that would be meaningless. Also, because the boundary is not a known point, the user would otherwise be faced with a serious challenge in seeking to synchronize at the boundary for the user's particular application. Inevitably, the change will occur at the boundary because the value written to master register 33 is, by implementation, always transferred to slave register 34, for performance of a comparison with the value of the timer register 43 by comparator 47 to fix the desired pulse width of the PWM output waveform.

When the values of the two registers 34 and 43 are equal, an output is generated by the comparator 47 to reset a latch 48. This produces a PWM output with 8-bit resolution at an external pin 50 of the PWM module. The output resolution may be programmed for up to 10 bits by concatenating the 8-bit timer register with a 2-bit internal clock state to create the 10-bit time base.

Thus, the PWM output shown in FIG. 4 is a pulse waveform on pin 50, having a period established by the setting of latch 48 by comparator 45 and a duty cycle established by the resetting of the latch by comparator 47. This pulse width modulation function of PWM module 30 may be used in any of a wide variety of control applications, such as the previously mentioned speed control of a DC motor. The PWM output may be amplified through a power driver stage (not shown) and fed to the motor. In effect, the output represents an analog value proportional to the duty cycle.

Figure 3:
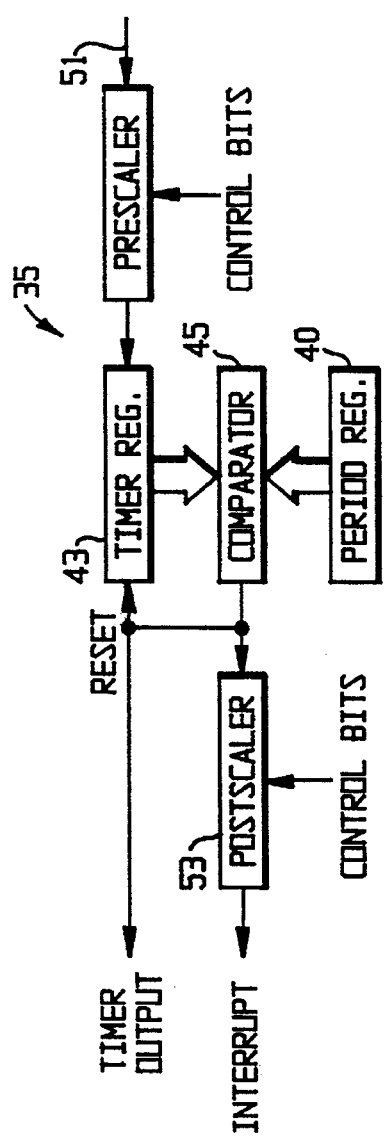
FIG. 3 is a simplified block diagram of a timing module used with the PWM module of FIG.2, according to the invention.

The timer is illustrated in more detail in FIG. 3. It may be operated in either a timer mode, in which an internal clock is used as clock input, or in a counter mode, in which the timer increments on the rising edge of an external clock input. In either mode, the clock input from an oscillator (not shown) at 51 is divided by a programmable prescaler 52 at any of the ratios 1:1, 1:4, or 1:16 according to control bits applied to the prescaler. The prescaling, together with the value written to period register 40, provides gross to fine adjustment of the PWM period. The operation of period register 40, timer register 43, and comparator 45 is as described above.

In the usual sequence of events, each time comparator 45 generates a match, the timer is reset and an interrupt is generated to the CPU to ultimately allow a new value to be written into period register 40. As noted earlier herein, the resulting interrupt occurs at every boundary of the PWM waveform, contemporaneously with the commencement of each period of the PWM output, which imposes considerable overhead on the CPU. This is exacerbated by the desire for high frequency PWM output in many applications, in part to eliminate noise and whine attributable to rotating devices, such as a computer fan motor, controlled by the PWM output of the microcontroller. As the PWM output frequency is increased, the more frequent interrupts of the CPU increases overhead, slowing operation of the CPU and thereby adversely affecting operation of the microcontroller.

According to the present invention, a 4-bit postscaler 53 is employed to subdivide the timer output for purposes of generating interrupts to the CPU. To avoid an effect on the PWM period, the postscaling is performed in a path parallel to that used for the timer output. In addition, it will be observed that the divided output constituting the interrupts does not affect the desired resetting of the timer register. The match (EQ) output of comparator 45 is applied to postscaler 53, and separately, as a reset to timer register 43 and as the timer output to set latch 48. Although the value held in the period register 40 cannot be changed as frequently as a consequence of more widely spaced interrupts, this is not of serious concern because for any particular application of the microcontroller, the PWM period will generally be held fixed and only the duty cycle is changed to accommodate the desired pulse width modulation.

The postscaler is programmed by means of control bits to divide the interrupt rate in ratios ranging from 1:1 to 1:16 (i.e., once every 16 PWM periods). As shown in the example of FIG. 4, the postscaler has been programmed to produce interrupts on every fourth cycle of the PWM waveform.

Postscaler 53 may also be used for other purposes, such as to set the timing of a servo loop. In closed loop control systems, the input is sampled regularly as the sampling rate or servo loop time, the new control output is computed, and the new control value is provided as an output, often as a PWM output waveform. The CPU may be tasked to set the servo loop frequency at a lower value (say 1 KHz) than the PWM output frequency (say 10 KHz). In those circumstances, the normal PWM module output can be set at the 10 KHz rate, while the postscaler is set at a divider ratio of 1:10 to generate a steady interrupt rate of 1 KHz to the CPU. The CPU then uses this interrupt rate for the basic servo loop timing. Also, the PWM output is automatically synchronized with the servo loop for better control.

Although the best mode presently contemplated for practicing the invention has been described in terms of a presently preferred embodiment and method, it will be apparent to those skilled in the art that variations and modifications of the described embodiment and method may be implemented without departing from the true spirit and scope of the invention. Accordingly, it is intended that the invention shah be limited only by the appended claims and the pertinent rules of applicable law.

What is claimed is:

1. A microcontroller device fabricated in a semiconductor integrated circuit (IC) chip for controlling an external system with which the device is to be installed in circuit, comprising:

a central processing unit (CPU), a program memory coupled to the CPU for storing an instruction program to be implemented by the CPU, a data memory coupled to the CPU for storing data including data representing parameters to be used by the CPU in controlling the external system, and on-chip peripheral timing module means coupled to the CPU for establishing the timing and degree of control exercised over the external system by generating a repetitive event configured as a pulse waveform, said timing module means including means for selectively setting the period of the pulse waveform to designate the frequency of occurrence of said repetitive event for timing said control, means responsive to the selected setting of the period of the pulse waveform for selectively modulating the width of the pulse in each period of the pulse waveform for designating the duty cycle of the pulse waveform and, thereby the degree of said control, independently of the period of the pulse waveform, and means further responsive to the selected setting of the pulse waveform period for generating periodic interrupts of the CPU, said interrupt generating means including means for selectively varying the frequency of the periodic interrupts of the CPU at any of a plurality of periods of the pulse waveform greater than two.

2. The microcontroller device of claim 1, wherein:

said frequency varying means comprises a divider circuit.

3. The microcontroller device of claim 1, wherein:

said frequency varying means reduces the frequency of the periodic interrupts.

4. The microcontroller device of claim 1, wherein:

said frequency varying means comprises means for selectively setting the time for control of said external system separately from and in synchronism with the timing provided by the selected setting of the period of the pulse waveform.

5. The microcontroller device of claim 4, wherein:

said selective period controlling means comprises a timer register, a period register, and a comparator for generating an output pulse along a circuit path as the periodic time of occurrence of said repetitive event when a count of said timer register equals a count entered in said period register, and said selective time controlling means comprises a postscaler circuit responsive to said comparator output pulse, for producing an interrupt pulse upon the generation of a selected number of comparator output pulses greater than two, said postscaler circuit being located in a circuit path parallel to said circuit path along which said comparator output pulse is generated, to avoid affecting the selected periodic time of occurrence of said repetitive event.

6. A timing function module for a microcontroller device having a central processing unit (CPU), memory, and peripherals for performing control functions, comprising:

means coupled to the CPU for generating a repetitive event, means responsive to said generating means for selectively controlling the periodic time of occurrence of said repetitive event to affect the frequency of a control function, and means responsive to said selective periodic time controlling means for selectively interrupting the performance of the CPU at a rate different from the frequency of said control function and synchronous therewith, including means responsive to the selected periodic time of occurrence of said event for interruption of the CPU upon the generation of every nth event, where n is an integer greater than two.

7. The timing function module of claim 6, wherein:

said selective interrupting means comprises a divider circuit.

8. The timing function module of claim 6, wherein:

said selective periodic time controlling means comprises a timer register, a period register, and a comparator for generating an output pulse along a circuit path as the periodic time of occurrence of said repetitive event when a count of said timer register equals a count entered in said period register, and said selective interrupting means comprises a postscaler circuit responsive to said comparator output pulse, for producing an interrupt pulse upon the generation of a selected number of comparator output pulses greater than two.

9. The timing function module of claim 8, wherein:

said postscaler circuit is located in a circuit path parallel to said circuit path along which said comparator output pulse is generated, to avoid affecting the selected periodic time of occurrence of said repetitive event.

* * * * *

UNITED STATES PATENT AND TRADEMARK OFFICE
CERTIFICATE OF CORRECTION

PATENT NO. : 5,594,894

DATED : January 14, 1997

INVENTOR(S) : Kue et al

It is certified that error appears in the above-indentified patent and that said Letters Patent is hereby corrected as shown below:

Column 1
   Line 23, "(MEG)" (second occurrence) should be --(MCG)--.

Column 2
   Line 64, "($X_z$," should be --($X_1$,--.

Column 3
   Line 27, "$y_i$-$y_j$" should be --$y_i$-$y_j'$--.

Column 8
   Line 38, "(-0,005," should be --(-0.005,--;
   Line 53, " $\wedge_2$,...., $\wedge_r$)" should be --$\lambda_2$,....,$\lambda_r$)--.

Signed and Sealed this

Twenty-seventh Day of May, 1997

Attest:

BRUCE LEHMAN

*Attesting Officer*     *Commissioner of Patents and Trademarks*